May 24, 1960 T. F. UPTON 2,937,470

TELEPHONE BOOK STANDS

Filed Jan. 21, 1959 2 Sheets-Sheet 1

INVENTOR.
Thomas F. Upton

BY

S. Alphen Baker
ATTORNEY

May 24, 1960 T. F. UPTON 2,937,470

TELEPHONE BOOK STANDS

Filed Jan. 21, 1959 2 Sheets-Sheet 2

INVENTOR.
Thomas F. Upton
BY
S. Stephen Baker
ATTORNEY

United States Patent Office 2,937,470

Patented May 24, 1960

2,937,470

TELEPHONE BOOK STANDS

Thomas F. Upton, Forest Hills, N.Y., assignor to Herculox Loose Leaf Corporation, New York, N.Y., a corporation of New York Filed Jan. 21, 1959, Ser. No. 788,179

8 Claims. (Cl. 45—85)

This invention relates to telephone book stands or supports which are connected to a telephone booth and whereby one or more telephone books may be supported in a structure for convenient consultation and maintenance. The telephone book stand of this invention finds particular usefulness in outdoor telephone booths.

Structures for maintaining telephone books where they can be swung up into a reading position or lowered into a normal or rest position have, of course, been long known and are in wide usage. However, the present invention provides such a structure which is considerably simplified relative to those now in use and further embodies a great number of other advantages. For example, the structure is such as to permit telephone books maintained in a binder, to be most easily installed or removed so as to permit substitution of another telephone book by an authorized maintenance man. However, the structure is difficult to remove by an unauthorized person.

Experience in the maintenance of telephone booths has revealed the fact that unauthorized persons often remove or steal telephone books if they are not securely protected against such vandalism. The structure of this invention makes it almost impossible or at least unlikely that an unauthorized person will be able to remove a telephone book from its support. However, a simple key, employed by the authorized maintenance man, will serve to unlock the book and its binder from the supporting structure.

Another object of this invention is to improve the readability of telephone books. In structures of the kind under present consideration, it is often difficult for the user to consult the names and telephone numbers at the inner edges of the book. According to this invention, however, the book is permitted to tilt in respect to its support so as to provide better visual access.

The invention will be further understood from the following description and drawings in which.

Figures 1, 2:
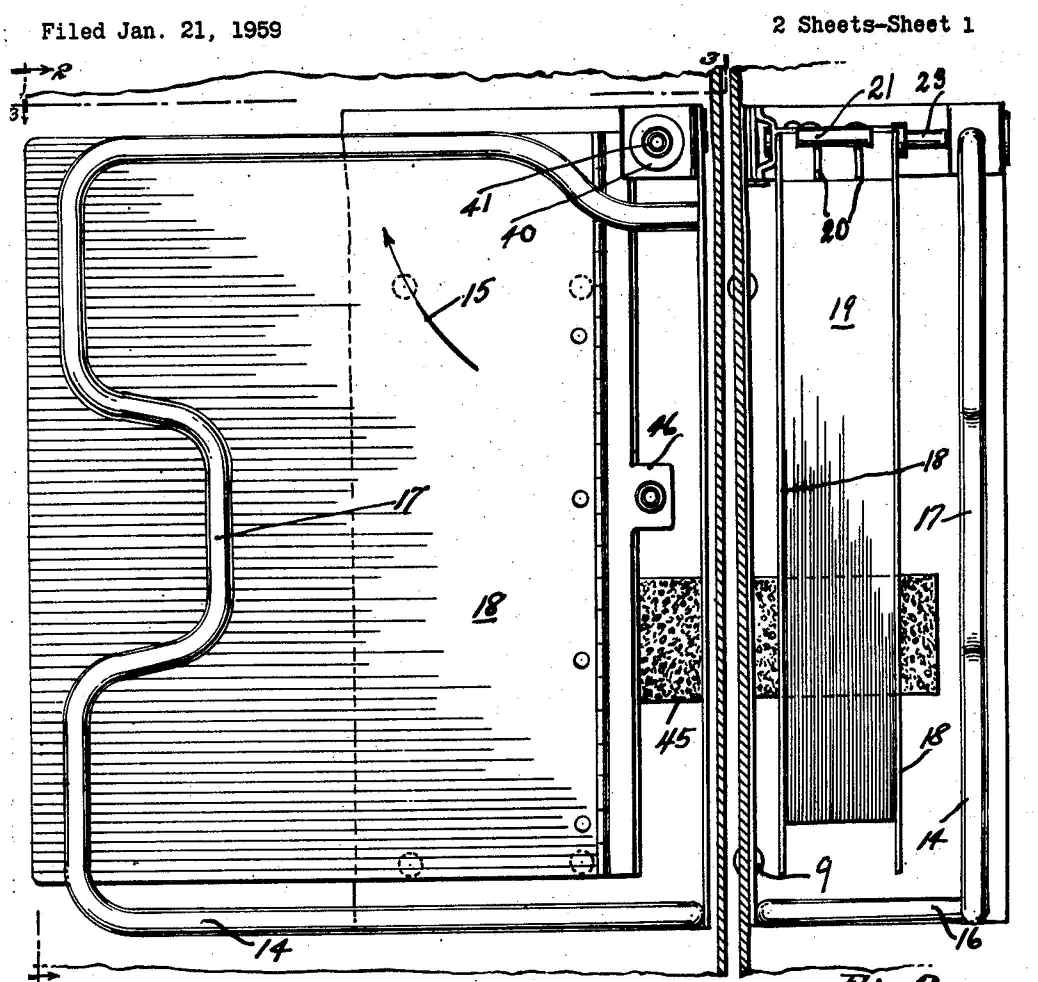
Figure 1 is an elevational view disclosing the improved structure as connected to a telephone booth, the booth being shown cut away, the view is taken along the line 1—1 of Figure 3.
Figure 2 is an elevational view as taken along the line 2—2 of Figure 1 and showing a front view of the device.

The frame of the telephone book supporting structure is connected as by rivets 9 to a corner section 10 of the telephone booth wall 11. The supporting structure itself comprises a telephone book and binder receiving structure or chamber consisting of two stationary vertical walls 12 and 13 which may be integral and bent into a 90° or L-shaped relationship so as to receive the telephone book together with its binder as will hereinafter be explained. A frame wall member 14 encloses the telephone book binder at the side opposite wall 12. Wall section 14 is in the form of a frame member rather than a solid wall so as not to impede manual swinging of the structure upwardly in a vertical plane in the direction indicated by the arrow 15 in Figure 1. Side wall 12, back wall 13 and frame wall member 14 form a chamber for receiving the telephone book in its binder. The bottom supporting structure comprises the frame member 16 so that the telephone book in its binder is substantially enclosed along all sides except the top so as to permit upward swinging of the binder. As will be observed in Figure 1, frame member 14 has a U-shaped inward deformation 17 which facilitates the grasping of the telephone book binder 18 so as to swing it upwardly for consultation purposes.

The binder 18 is essentially similar to that disclosed in James P. Guinane Patent No. 2,856,728 dated October 21, 1958. Accordingly, it is unnecessary to describe the structure of the various elements thereof, the binder per se not being a part of this invention. The telephone book 19 is shown connected to the binder top and bottom ends as by wire rods 20 such as have been shown in said prior patent. Top bracket 21, as has been explained in said prior patent, permits the binder to be swingably supported and at the same time serve as a connection for book holding rods 20 while permitting the expansion or contraction of the binder to vary its capacity. These elements per se are not a part of this invention. Integrally formed with and depending from the rear edge of bracket 21, is the tubular element 22 (Figure 4) which rotatably embraces supporting shaft 23.

The function and structure of supporting shaft 23 and the shaft seat member 24 are important elements of this invention. Shaft 23 swingably supports the telephone book and its binder so as to enable them to be swung upwardly in consulting position or to be returned downwardly to a normal position. In order to maintain bracket 21 in position a stop ring 25 is secured in position as by a set screw 26 of the Allen type. Such a set screw is desirable since a vandal would not be likely to have an Allen screw driver in his possession.

Figure 6:
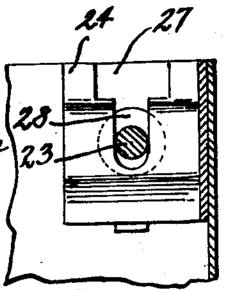
Figure 6 is a cross-sectional view as taken along the line 6—6 of Figure 4.

Shaft supporting seat member 24 is formed with an upwardly open slot 27 (Figure 6). Seat member 24 extends inwardly as observed in Figure 4 so as to receive the headed end 28 of shaft 23 which then seats itself substantially at the floor of slot 27 as illustrated in Figure 6.

Figure 3:
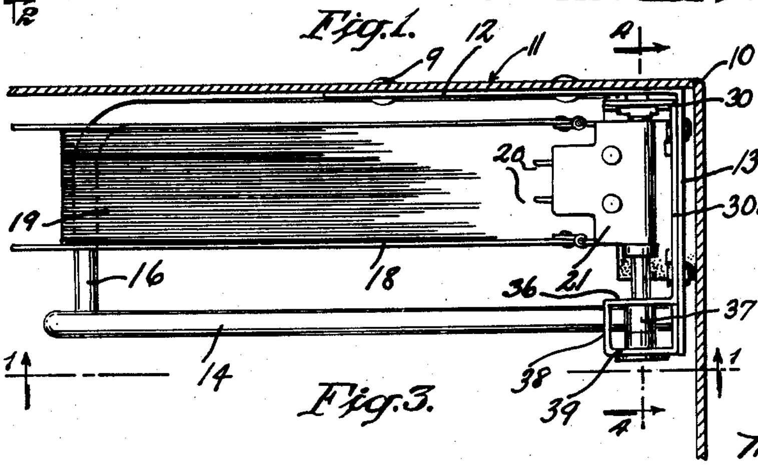
Figure 3 is a top view as taken along the line 3—3 of Figure 1.

Seat member 24 is welded or otherwise secured to swingable elongated bracket member 30. The rear wall 30*a* of bracket member 30 lies adjacent and extends parallel to vertical wall 13 as illustrated in Figure 3. It is connected to wall 13 by a pivot pin 31 as well as by pin 32 which is riveted to vertical wall 13 and which is slidably received in substantially vertical slot 33. Slot 33 is formed in bracket member 30 so as to enable said bracket member to tilt away from wall 12 as will hereinafter be described. Normally, bracket member 30 rests upon ledges 34 integrally cut from wall 12.

As has been explained hereinabove, shaft 23 may be simply dropped into and seated within seat member 24. It will be observed that the opposite end of shaft 23 has a reduced portion 35 which enters a central opening in bracket wall 36. A lock 37 is applied to said reduced end 35. The action of lock 37 has been described in James P. Guinane, U.S. Patent No. 2,815,971, dated December 10, 1957. The lock 37 substantially duplicates the lock described and claimed in said patent.

Figure 4:
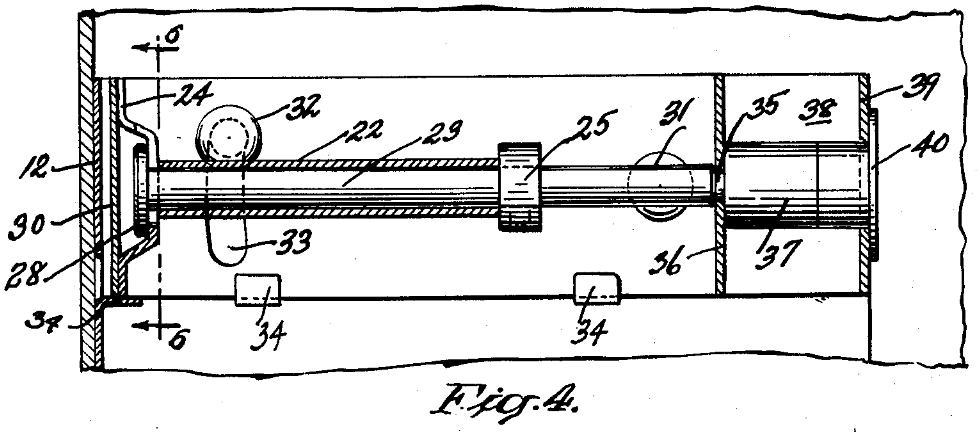
Figure 4 is an enlarged cross-sectional view as taken along the line 4—4 of Figure 3.

Wall 39 is integral with bracket 30 and forms the front wall of a square shaped enclosure 38 as noted in Figure 3. Lock 37 is disposed in said enclosure 38. Outer wall 39 of enclosure 38 has an opening through which lock 37 extends as illustrated in Figure 4. The outer end of lock 37 is formed with an end disk 40 which is disposed outwardly of wall 39. As will be noted in Figure 1, disk 40 has a central opening providing access to the threaded element 41 of lock 37. The function of said threaded element has been sufficiently set forth in the above mentioned Patent No. 2,815,971. Disk 40 is fixedly connected to the outer body of lock 37 so as to be disassociated from threaded engaging element 41.

The binder together with the telephone book is installed simply into the support by inserting reduced end 35 of shaft 23 through the central opening of wall 36 and then dropping the headed end 28 into the seat member 24. At this time, and in order to lock the shaft 23, the lock is introduced through the central opening of wall 39 as illustrated in Figure 4 and is caused to embrace the reduced end 35, the disk 40 then being flatly seated against the outer surface of wall 39. This automatically locks the shaft in place. The lock can only be removed by the key such as described in the above Patent No. 2,815,971, said key consisting simply of a shaft with a threaded end which fits into the opening of threaded element 41 and is thereby enabled to pull element 41 outwardly so as to cause it to release from reduced end 35 as described in said Patent No. 2,815,971. The function of disk 40, not shown in said Patent No. 2,815,971, is desirable in that it provides a stop for the threaded end of the key, not shown herein, so that simply threading the key into the lock 37 causes said lock to release from the reduced end 35 and enables the lock to be pulled outwardly when the book is to be replaced.

Figure 5:
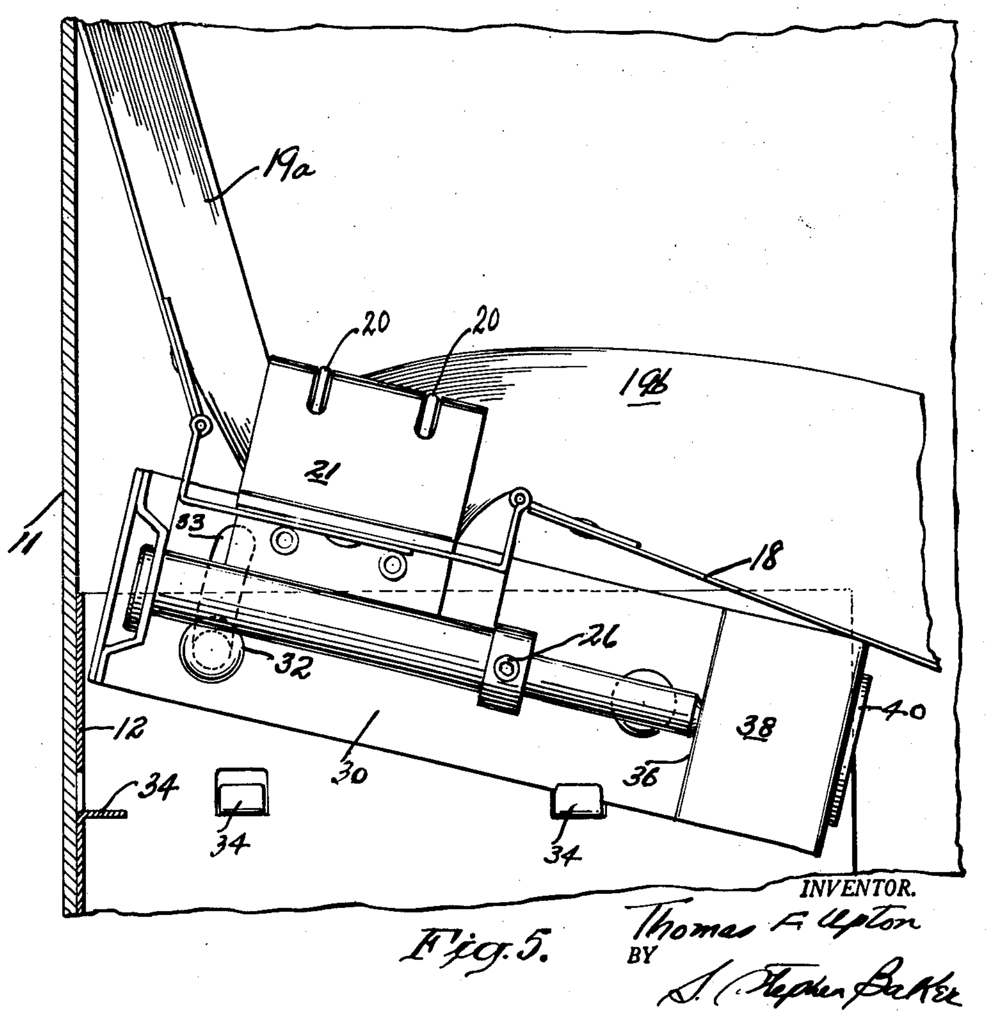
Figure 5 is a view illustrating the tilting of the binder supporting mechanism during normal usage of the binder.

An important element of this invention is the fact that when the telephone book is disposed flatly against the wall of the telephone booth, it is difficult to consult inner portions of the telephone book. I have solved this problem by causing the bracket member 30 to tilt laterally in respect to the supporting structure as illustrated in Figure 5. Thus, when the telephone book is first raised in a vertical plane and then allowed to separate into two portions **19*a* and 19*b*, the bracket member 30, by the action of pin 32 in slot 33, will tilt the telephone book away from the booth wall 11 (as well as from vertical wall 12) in a plane perpendicular to said vertical plane so as to permit greater separation between the telephone book sections 19*a* and 19*b*** and thus render the inner portions of the book more accessible visually.

The tilting action of bracket member 30 is not particularly made aware to the user. The user simply lifts the book up as he normally would do and permits it to open. This action will automatically cause the swingable bracket member 30 to tilt upwardly or away from the booth wall 11.

When the telephone book binder is allowed to return to its normal position, it will strike a rubber bumper block 45 as is conventional. The binder is also provided with a center lock 46 the operation of which has been described in James P. Guinane and Raymond F. Batchelar Patent No. 2,862,329, dated December 2, 1958.

There has been shown what is now considered a preferred embodiment of the invention but it is obvious that changes and omissions may be made without departing from its spirit.

What is claimed is:

1. A book supporting structure comprising an elongated bracket member, stationary wall means to support said bracket member, a shaft disposed across said bracket member, means on said shaft for swingably supporting a telephone book in a binder, a shaft seat formed on one end of said bracket member, one end of said shaft being removably received in said shaft seat, a wall at the other end of said bracket member, the other end of said shaft extending through an opening in said wall, and a releasable lock on said other end of said shaft whereby said shaft may be removed from said bracket member by removing said one end thereof from said shaft seat and releasing said lock at said other end of said shaft.

2. A book supporting structure according to claim 1 and wherein said seat is formed with an open upper end for receiving said one end of said shaft, and a head on said one end of said shaft, said head being receivable in said open upper end.

3. A book supporting structure according to claim 2 and wherein said stationary wall means comprises a stationary vertical wall, said bracket member being swingably connected to said vertical wall so as to be tiltable relative thereto whereby said bracket member shaft, and a telephone book and binder supported on said shaft may be lifted upwardly in respect to said vertical wall while said telephone book and binder are swung on said shaft.

4. A book supporting structure according to claim 3 and wherein said bracket member is formed with a substantially vertical slot, and a pin on said vertical wall which is slidable in said slot.

5. A book supporting structure comprising a stationary vertical wall, a chamber of which said vertical wall is a portion, said chamber having an open top and being adapted to receive a telephone book therein, said telephone book being normally adjacent to said vertical wall and being swingably mounted and adapted to be swung upwardly in a vertical plane out of the chamber for consultation purposes, and means for tilting the telephone book laterally from its said normal position in a plane perpendicular to said vertical plane so as to render inner portions of the telephone book more visually accessible.

6. A book supporting structure according to claim 5 and including a second stationary vertical wall integrally connected to said first named vertical wall in an L-shaped relationship, said second vertical wall forming the back wall of said chamber, and said tilting means comprising an elongated bracket member swingably connected to said second vertical wall so as to be tiltable in a vertical plane away from said first named vertical wall.

7. A book supporting structure according to claim 6 and including a telephone book supporting shaft disposed across said bracket member, a seat at one end of said bracket member and adapted to removably receive one end of said shaft, an integral square-shaped enclosure at the other end of said bracket member, the other end of said shaft being disposed within said square-shaped enclosure and a lock disposed at said other end of said shaft and located within said square-shaped enclosure, the outer wall of said square-shaped enclosure having an opening formed therein and through which said lock may be removed.

8. A book supporting structure according to claim 7 and wherein said bracket member is formed with a rear wall extending adjacent to said second vertical wall, said bracket rear wall being formed with a slot, and a pin on said second vertical wall slidable in said slot whereby said bracket member together with said shaft may be swung laterally in respect to said first named vertical wall.

References Cited in the file of this patent

UNITED STATES PATENTS

| | | |
|---|---|---|
| 1,666,803 | Walker | Apr. 17, 1928 |
| 2,839,064 | Haskin | June 17, 1958 |
| 2,856,728 | Guinane | Oct. 21, 1958 |
| 2,862,329 | Guinane et al. | Dec. 2, 1958 |